United States Patent
Makita et al.

(10) Patent No.: US 11,932,270 B2
(45) Date of Patent: Mar. 19, 2024

(54) VEHICLE DRIVING SYSTEM

(71) Applicant: TOYOTA JIDOSHA KABUSHIKI KAISHA, Toyota (JP)

(72) Inventors: Mitsugu Makita, Nagoya (JP); Keigo Hiruma, Kariya (JP); Shogo Nakata, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 16/752,972

(22) Filed: Jan. 27, 2020

(65) Prior Publication Data

US 2020/0290636 A1 Sep. 17, 2020

(30) Foreign Application Priority Data

Mar. 12, 2019 (JP) ................. 2019-044904

(51) Int. Cl.
*B60W 50/10* (2012.01)
*B60W 50/00* (2006.01)
*G05D 1/00* (2006.01)

(52) U.S. Cl.
CPC .......... *B60W 50/10* (2013.01); *G05D 1/0088* (2013.01); *B60W 2050/0091* (2013.01); *B60W 2540/215* (2020.02)

(58) Field of Classification Search
CPC ............... B60W 30/095; B60W 50/10; B60W 2050/0091; B60W 2540/215; B60W 50/00; B60W 2050/007; B60W 50/082; B60W 30/182; B60W 20/50; B60W 2050/0095; F16H 61/0248; G05D 1/0088; G05D 2201/0213; G05D 1/0061

USPC ................ 701/25, 27, 48, 60, 65; 700/101
See application file for complete search history.

(56) References Cited

U.S. PATENT DOCUMENTS

| 7,991,491 B2 * | 8/2011 | Flemisch ................ G05B 7/02 700/83 |
| 2005/0268302 A1 * | 12/2005 | Geib ...................... G06F 9/526 |
| 2007/0129815 A1 | 6/2007 | Flemisch et al. |

(Continued)

FOREIGN PATENT DOCUMENTS

| JP | 9-160643 A | 6/1997 |
| JP | 2014-78169 A | 5/2014 |

(Continued)

*Primary Examiner* — Elaine Gort
*Assistant Examiner* — Ellis B. Ramirez
(74) *Attorney, Agent, or Firm* — Oblon, McClelland, Maier & Neustadt, L.L.P.

(57) ABSTRACT

A vehicle driving system is equipped with an automatic driving control unit that outputs a signal for automatically actuating a plurality of pieces of in-vehicle operational equipment that can be operated by a driver, a manual driving control unit that outputs a signal to the pieces of the in-vehicle operational equipment based on an operational input by the driver, and an interface control unit that is connected to the automatic driving control unit, the manual driving control unit and the pieces of the in-vehicle operational equipment, that receives at least one of the signal output from the automatic driving control unit or the signal output from the manual driving control unit, and that outputs the received signal to the pieces of the in-vehicle operational equipment.

6 Claims, 1 Drawing Sheet

(56) References Cited

U.S. PATENT DOCUMENTS

| | | | |
|---|---|---|---|
| 2009/0055046 A1* | 2/2009 | Harumoto | B60H 1/00771 |
| | | | 701/36 |
| 2017/0227960 A1* | 8/2017 | Joyce | G05D 1/0088 |
| 2017/0235306 A1* | 8/2017 | Seki | B60W 40/08 |
| | | | 701/23 |
| 2018/0065643 A1* | 3/2018 | Nishimine | B60K 6/445 |
| 2018/0066750 A1* | 3/2018 | Nishimine | F16H 61/0248 |
| 2018/0215392 A1* | 8/2018 | Kosaka | B60W 50/12 |
| 2018/0281788 A1* | 10/2018 | Uchida | B60W 50/00 |
| 2019/0080609 A1* | 3/2019 | Mizoguchi | B62D 15/0255 |
| 2019/0220006 A1* | 7/2019 | Ueno | G05D 1/0055 |
| 2019/0241196 A1* | 8/2019 | Yamamoto | B60W 50/14 |
| 2021/0046852 A1* | 2/2021 | Ushiro | B60N 2/0292 |

FOREIGN PATENT DOCUMENTS

| | | |
|---|---|---|
| JP | 2014-119295 A | 6/2014 |
| JP | 2017-159840 A | 9/2017 |
| JP | 2017-196965 A | 11/2017 |
| JP | 2018-108768 A | 7/2018 |

\* cited by examiner

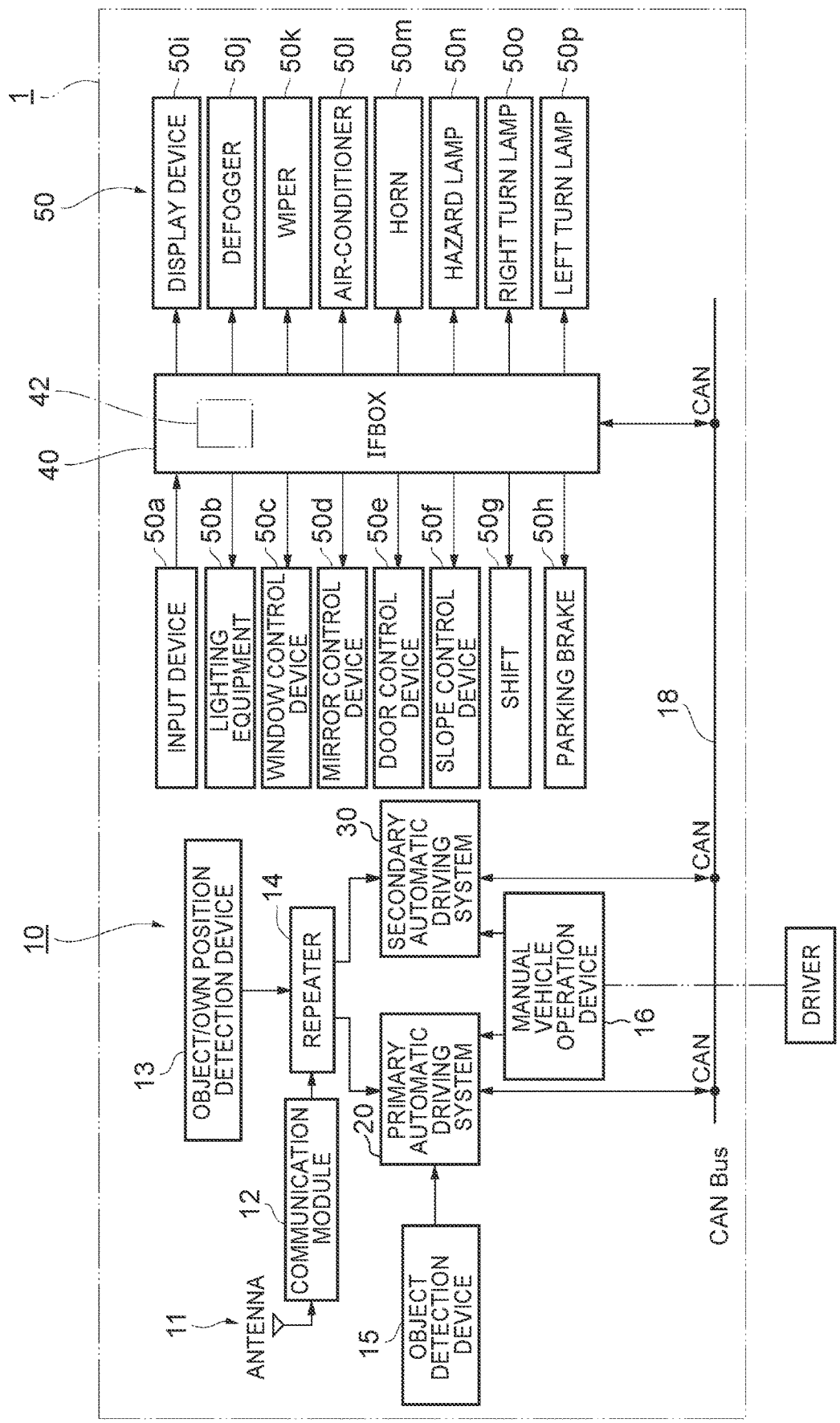

VEHICLE DRIVING SYSTEM

INCORPORATION BY REFERENCE

The disclosure of Japanese Patent Application No. 2019-044904 filed on Mar. 12, 2019 including the specification, drawing and abstract is incorporated herein by reference in its entirety.

BACKGROUND

1. Technical Field

The disclosure relates to a vehicle driving system.

2. Description of Related Art

Conventionally, there is disclosed an art of making a changeover between automatic driving and manual driving in accordance with an abnormal situation of a vehicle that is equipped with an automatic driving circuit and a manual driving circuit (e.g., see Japanese Patent Application Publication No. 2017-159840 (JP 2017-159840 A)).

When a case of automatic driving of a vehicle is assumed, a preliminary system (a secondary automatic driving system) for enabling operational input by a driver is required, in addition to an automatic driving system (a primary automatic driving system) that substitutes for the driver, in the event of a malfunction of the system or the like. In short, from a failsafe point of view, the automatically driven vehicle needs to be equipped with two different systems, namely, primary and secondary control systems in charge of vehicle running control.

Besides, this automatically driven vehicle also necessitates an operation system control device for automatically actuating pieces of equipment (pieces of in-vehicle operational equipment) subjected to manual input operation by the driver, for example, a wiper, turn lamps, and a horn.

SUMMARY

However, in the automatically driven vehicle equipped with the two different systems, namely, the primary and secondary automatic driving systems as described above, when an attempt is made to directly connect each of the plurality of the pieces of the in-vehicle operational equipment to the systems, individual wire harnesses are required, and the number of wirings increases correspondingly. Besides, the wirings tend to become complicated.

Thus, the disclosure aims at providing a vehicle driving system that can restrain wirings from becoming excessive in number and complicated even in the case where a large number of pieces of in-vehicle equipment are connected to two different automatic driving systems.

A vehicle driving system according to one aspect of the disclosure is equipped with an automatic driving control unit that outputs a signal for automatically actuating a plurality of pieces of in-vehicle operational equipment that can be operated by a driver, a manual driving control unit that outputs a signal to the pieces of the in-vehicle operational equipment based on an operational input by the driver, and an interface control unit that is connected to the automatic driving control unit, the manual driving control unit and the pieces of the in-vehicle operational equipment, that receives at least one of the signal output from the automatic driving control unit or the signal output from the manual driving control unit, and that outputs the received signal to the pieces of the in-vehicle operational equipment.

In this vehicle driving system, the pieces of the in-vehicle operational equipment are connected to each of the automatic driving control unit and the manual driving control unit, which constitute the two different systems, namely, the primary and secondary automatic driving systems, through the interface control unit. According to this configuration, the individual wirings as in the case where the respective pieces of the in-vehicle operational equipment are directly connected to each of the units are not required. Accordingly, the wirings can be simplified, and the number thereof can be reduced.

The interface control unit in the vehicle driving system of the aspect as described above may have a control device that determines which one of the signal output from the automatic driving control unit and the signal output from the manual driving control unit should be given priority, when receiving both the signals.

Besides, a vehicle driving system according to another aspect of the disclosure is a vehicle driving system that determines, by an interface control unit, which one of a signal from an automatic driving control unit that outputs a signal for automatically actuating a plurality of pieces of in-vehicle operational equipment that can be operated by a driver, and a signal from a manual driving control unit that outputs a signal to the pieces of the in-vehicle operational equipment based on an operational input by the driver should be given priority, when receiving both the signals.

According to the disclosure, the wirings can be restrained from becoming excessive in number and complicated even in the case where a large number of pieces of in-vehicle equipment are connected to the two different automatic driving systems.

BRIEF DESCRIPTION OF THE DRAWING

Features, advantages, and technical and industrial significance of exemplary embodiments of the disclosure will be described below with reference to the accompanying drawing, in which like numerals denote like elements, and wherein:

FIG. 1 is a view schematically showing a configuration example of a vehicle driving system.

DETAILED DESCRIPTION OF EMBODIMENTS

A preferred embodiment of a vehicle driving system according to the disclosure will be described with reference to the accompanying drawing (see FIG. 1).

A vehicle driving system 10 is a system for realizing automatic driving of a vehicle 1, and is configured to be equipped with a plurality of automatic driving systems. The vehicle driving system 10 according to the present embodiment is configured as a system that is equipped with a primary automatic driving system (an automatic driving control unit) 20 for automatically actuating various pieces of in-vehicle operational equipment 50, a secondary automatic driving system (a manual driving control unit) 30, and also an interface control unit 40 or the like (see FIG. 1). Besides, in addition to the foregoing, the vehicle driving system 10 according to the present embodiment further includes an antenna 11, a communication module 12, an object/own position detection device 13, a repeater 14, an object detection device 15, and a manual vehicle operation device 16.

The primary automatic driving system 20 is a system including a control device for automatically actuating the pieces of the in-vehicle operational equipment 50 instead of a driver. Although not shown in particular in the drawing, the control device has a control unit and a storage unit. The control unit may include a computer for the automatic driving systems. The storage unit is constituted of storage devices such as a hard disk drive, a non-volatile memory and a register, and stores determination information. The determination information is information including contents associated with driving control corresponding to detection information from an outside such as the object detection device 15 or the like.

The secondary automatic driving system 30 is a system that can function instead of the primary automatic driving system 20 in accordance with a situation. The secondary automatic driving system 30 may be configured as a system similar to the primary automatic driving system 20. A control unit of a control device of the secondary automatic driving system 30 may include a subsidiary computer for a manual driving system.

The antenna 11 communicates with an external device, and receives a signal including information required for automatic driving. The communication module 12 is configured as, for example, an in-vehicle wireless communication device or the like, receives a signal from the antenna 11, and transmits information to the primary automatic driving system 20 and/or the secondary automatic driving system 30 via the repeater 14.

The object/own position detection device 13 detects positions of an external object and an own vehicle from information obtained through the use of, for example, an in-vehicle radar or an in-vehicle camera (including a 3D camera). The positional information detected by this object/own position detection device 13 is transmitted to the primary automatic driving system 20 and/or the secondary automatic driving system 30 via the repeater 14.

The object detection device 15 is a device that detects an object around the vehicle at the time of automatic driving, and is constituted of, for example, a front camera that images an area in front of the vehicle, and a rear camera that images an area behind the vehicle. Information detected by the object detection device 15 is transmitted to the primary automatic driving system 20 (see FIG. 1).

The manual vehicle operation device 16 is a device that transmits a signal corresponding to the driver's operation to the primary automatic driving system 20 and/or the secondary automatic driving system 30, and is constituted of, for example, various input devices such as an operation lever, an operation switch, an operation handle and the like.

The interface control unit 40 is a unit that is configured as an interface device (i.e., an IFBOX), and is connected to each of the primary automatic driving system 20 and the secondary automatic driving system 30 via a bus (CAN-Bus) 18. Besides, the various pieces of the in-vehicle operational equipment 50 are connected to the interface control unit 40 (see FIG. 1). The interface control unit 40 includes a control device 42. The control device 42 has a so-called setting function for determining which one of a signal transmitted from the primary automatic driving system 20 and a signal transmitted from the secondary automatic driving system 30 should be given priority and selecting one of the signals, based on which one of the primary automatic driving system 20 and the secondary automatic driving system 30 is mainly in operation, when the interface control unit 40 receives both the signals.

The pieces of the in-vehicle operational equipment 50 are various pieces of in-vehicle equipment (operational systems) that are conventionally operated by the driver or that can be operated by the driver. The pieces of the in-vehicle operational equipment 50 in the vehicle according to the present embodiment include an input device 50*a* to which a signal is input, a piece of lighting equipment 50*b*, a window control device 50*c*, a mirror control device 50*d*, a door control device 50*e*, a slope control device 50*f*, a shift 50*g*, a parking brake 50*h*, a display device 50*i*, a defogger 50*j*, a wiper 50*k*, an air-conditioner 50*l*, a horn 50*m*, a hazard lamp 50*n*, a turn lamp (right) 50*o*, and a turn lamp (left) 50*p* (see FIG. 1). Each of these pieces of the in-vehicle operational equipment 50 (50*a* to 50*p*) is connected to the interface control unit 40. Incidentally, it goes without saying that these various pieces of equipment are nothing more than concrete examples, and that the pieces of the in-vehicle operational equipment 50 can include pieces of equipment other than those mentioned herein.

In the vehicle driving system 10 as described above, it is assumed that the driver operates the input device 50*a* (e.g., a switch for the turn lamps) and inputs a signal for a predetermined direction indicating operation. The signal is received by the primary automatic driving system 20 and/or the secondary automatic driving system 30 through the interface control unit 40 and the bus 18. The primary automatic driving system 20 and/or the secondary automatic driving system 30 that have/has received the signal transmit/transmits a signal for causing the turn lamp (right) 50*o* or the turn lamp (left) 50*p* to perform the predetermined direction indicating operation, based on the received signal. When the interface control unit 40 receives this signal, the control device 42 carries out setting, if necessary, based on which one of the primary automatic driving system 20 and the secondary automatic driving system 30 is mainly in operation, and causes the turn lamp (right) 50*o* or the turn lamp (left) 50*p* to perform the direction indicating operation (see FIG. 1).

In the vehicle driving system 10 according to the present embodiment, there is adopted a configuration in which the respective pieces of the in-vehicle operational equipment 50 are connected to each of the primary automatic driving system 20 and the secondary automatic driving system 30 through (with the intermediary of) the interface control unit 40. In this configuration, the wirings are easier to simplify than in the case where the respective pieces of the in-vehicle operational equipment 50 are directly connected to each of the systems 20 and 30. Besides, it is easy to restrain the wirings from becoming excessive in number or complicated even when a large number of pieces of in-vehicle operational equipment 50 are connected to each of the systems 20 and 30. Besides, it is hence also easy to avoid an increase in cost.

Besides, in the case where the respective pieces of the in-vehicle operational equipment are directly connected to each of the systems 20 and 30, and the pieces of the in-vehicle operational equipment are endowed with setting functions (the functions of selecting which one of the signals from the primary automatic driving system 20 and the secondary automatic driving system 30, which constitute the two different systems, namely, the primary and secondary systems of the vehicle driving system 10, should be given priority when both the signals are simultaneously output therefrom), the number of required setting functions increases as the number of pieces of in-vehicle operational equipment increases, and the functions are scattered. In contrast, however, in the present embodiment, (the control device 42 of) the interface control unit 40 is endowed with the setting function, so it is easy to avoid the scattering thereof.

Incidentally, the above-mentioned embodiment is a preferred example of implementation of the disclosure, but the disclosure should not be limited thereto. The disclosure can be carried out after being modified in various manners within a range that does not depart from the gist of the disclosure. For example, the vehicle driving system 10 having the single interface control unit 40 has been described in the above-mentioned embodiment, but is nothing more than a preferred example. Although not shown in particular in the drawing, it is also acceptable to adopt a configuration in which, for example, a plurality of (e.g., two) interface control units 40 are arranged in parallel, and half of the plurality of the pieces of the in-vehicle operational equipment 50 are connected to each of the units 40.

The disclosure is preferably applicable to a vehicle driving system for realizing automatic driving of a vehicle.

What is claimed is:

1. A vehicle driving system comprising:
   an automatic driving control circuitry configured to output a first signal for automatically actuating a plurality of pieces of in-vehicle operational equipment that can be operated by a driver;
   a manual driving control circuitry configured to output a second signal to the pieces of the in-vehicle operational equipment based on an operational input by the driver; and
   an interface control circuitry connected to the automatic driving control circuitry, the manual driving control circuitry and the pieces of the in-vehicle operational equipment, and is configured to:
   receive the first signal output from the automatic driving control circuitry and the second signal output from the manual driving control circuitry;
   determine which one of the first signal and the second signal should be output to the in-vehicle operational equipment based on which one of the automatic driving control circuitry and the manual driving control circuitry is in operation;
   when it is determined that the automatic driving control circuitry is in operation, directly output the first signal to the pieces of the in-vehicle operational equipment that can be operated by the driver and operate the in-vehicle operational equipment that has received the first signal, the first signal having been output by the automatic driving control circuitry abased on the operational input to the pieces of the in-vehicle operational equipment by the driver; and
   when it is determined that the manual driving control circuitry is in operation, directly output the second signal to the pieces of the in-vehicle operational equipment that can be operated by the driver and operate the in-vehicle operational equipment that has received the second signal, the second signal having been output by the manual driving control circuitry abased on the operational input to the pieces of the in-vehicle operational equipment by the driver.

2. The vehicle driving system according to claim 1, wherein
   the interface control circuitry has a control device that is configured to determine which one of the first signal output from the automatic driving control circuitry and the second signal output from the manual driving control circuitry should be given priority, when receiving both the signals.

3. The vehicle driving system according to claim 1, wherein the interface control circuitry is further configured to:
   when it is determined that the automatic driving control circuitry is in operation, cause the in-vehicle operational equipment that has received the first signal to perform a predetermined operation based on the operational input by the driver; and
   when it is determined that the manual driving control circuitry is in operation, cause the in-vehicle operational equipment that has received the second signal to perform a predetermined operation based on the operational input by the driver.

4. The vehicle driving system according to claim 2, wherein the control device is further configured to:
   determine which one of the automatic driving control circuitry and the manual driving control circuitry is in operation;
   assign priority to the first signal when it is determined that the automatic driving control circuitry is in operation; and
   assign priority to the second signal when it is determined that the manual driving control circuitry is in operation.

5. A vehicle driving system comprising:
   an interface control circuitry configured to:
   determine, which one of a first signal from an automatic driving control circuitry that outputs a signal for automatically actuating a plurality of pieces of in-vehicle operational equipment that can be operated by a driver, and a second signal from a manual driving control circuitry that outputs a signal to the pieces of the in-vehicle operational equipment based on an operational input by the driver should be given priority, when receiving both the first and second signals;
   determine which one of the automatic driving control circuitry and the manual driving control circuitry is in operation;
   assign priority to the first signal;
   when it is determined that the automatic driving control circuitry is in operation, directly output the first signal to the pieces of the in-vehicle operational equipment that can be operated by the driver and operate the in-vehicle operational equipment that has received the first signal, the first signal having been output by the automatic driving control circuitry based on the operational input to the pieces of the in-vehicle operational equipment by the driver; and
   assign priority to the second signal;
   when it is determined that the manual driving control circuitry is in operation, directly output the second signal to the pieces of the in-vehicle operational equipment that can be operated by the driver and operate the in-vehicle operational equipment that has received the second signal, the second signal having been output by the manual driving control circuitry based on the operational input to the pieces of the in-vehicle operational equipment by the driver.

6. The vehicle driving system according to claim 5, wherein the interface control circuitry is further configured to:
   determine which one of the first signal from the automatic driving control circuitry and the second signal from the manual driving control circuitry should be output to the pieces of the in-vehicle operational equipment based on the assigned priority.

* * * * *